UNITED STATES PATENT OFFICE.

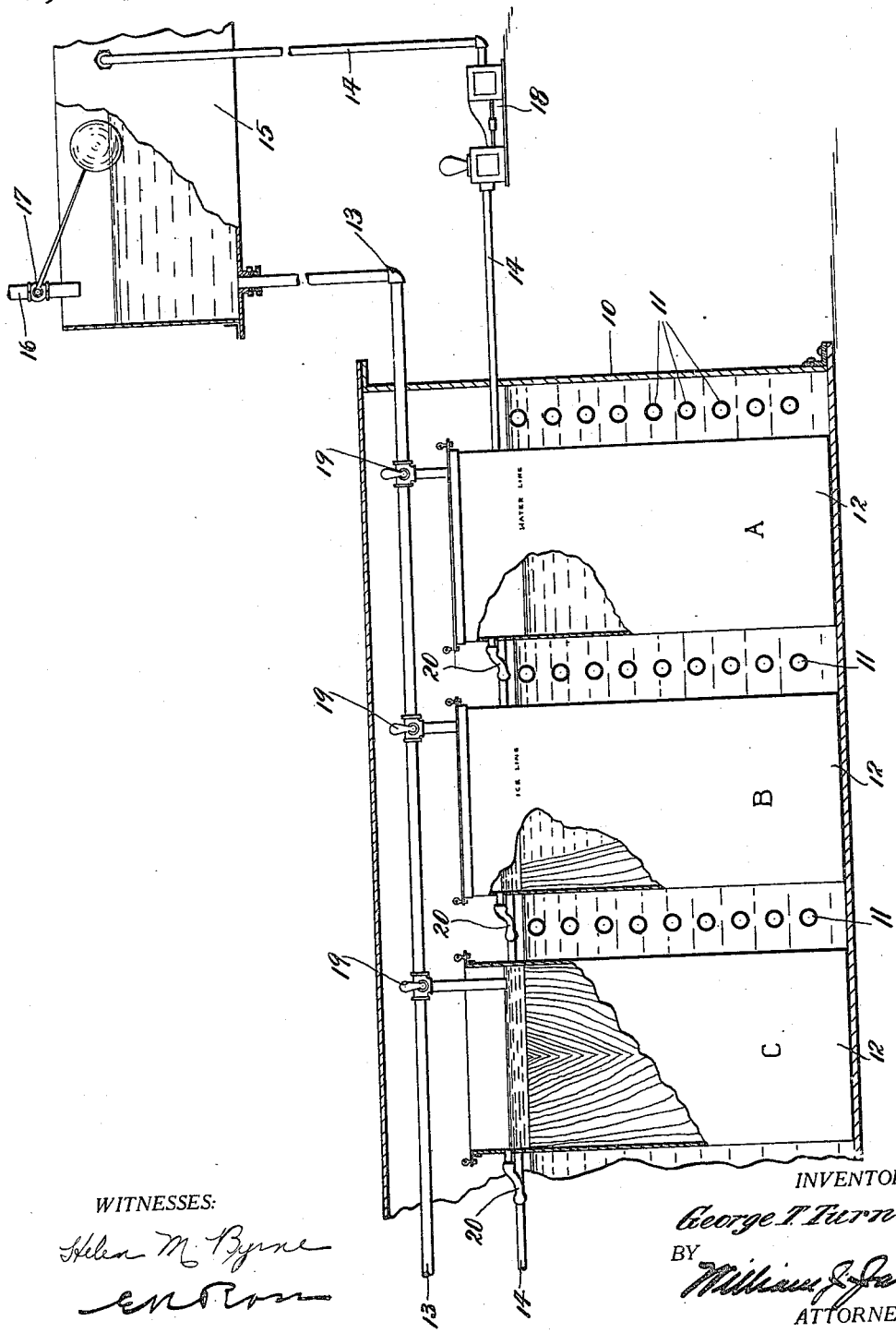

GEORGE T. TURNER, OF PHILADELPHIA, PENNSYLVANIA.

APPARATUS FOR MANUFACTURING ARTIFICIAL ICE.

1,225,893.　　　　　　　　Specification of Letters Patent.　　Patented May 15, 1917.

Application filed July 16, 1915. Serial No. 40,210.

*To all whom it may concern:*

Be it known that I, GEORGE T. TURNER, a citizen of the United States, residing at Philadelphia, in the county of Philadelphia and State of Pennsylvania, have invented a certain new and useful Apparatus for Manufacturing Artificial Ice, of which the following is a specification.

The principal object of the present invention is to provide a means of manufacturing ice artificially, wherein raw water, in contradistinction to distilled water, may be utilized to produce a product possessing commercial clearness. A further object is to cheapen the cost of production of artificial ice. Other and further objects relate to the providing of a new and novel method of artificial ice manufacture wherein a continuous cycle of raw water is maintained between a central supply and a series of containers for agitating the water in the containers to provide clearness of ice in the frozen product.

With these and other objects in view, the invention consists of the improvements hereinafter described and finally claimed.

The nature, characteristic features and scope of the invention will be more fully understood from the following description taken in connection with the accompanying drawings forming part hereof in which there is illustrated more or less diagrammatically a view of apparatus employed in the method of artificial ice manufacture about to be described.

By my method of producing ice artificially, I may use raw water, in contradistinction to distilled water. This, I am enabled to do because of the employment in my method of manufacture of a continuous cycle of water between a central supply and the containers within which the ice is formed. Such continuous cycle of water produces an agitation within said containers and causes the resultant frozen product to be commercially clear in contradistinction to being what is termed cloudy. In the manufacture of ice under this method, the apparatus disclosed in the drawings may be advantageously employed although obviously modified forms of apparatus may accomplish the same results.

In the drawings 10, designates a covered tank of any usual construction and contains a suitable saline solution. It is also equipped with pipes 11, through which is passed a compressed and cooled gas or vapor as anhydrous ammonia. Adapted to be set in the brine within the tank are metal containers or molds 12, of any desired number, a mold being located between adjacent rows of pipes 11, as shown. Each container is connected with a source of raw water by means of a supply pipe 13, and a return pipe 14. The source of supply is shown as being a tank 15, located in a plane above the tank 10. Raw water is supplied thereto by connection 16, the supply being automatically regulated by a suitable medium as a float and valve attachment 17. This attachment maintains a constant level of water within the tank for providing a predetermined static head or given pressure. The supply pipe 13, leads to and through the tank 10, above the containers. Connecting with the supply pipe are valved distributers 19, one for each container. Detachably connected with respect to each container and the return pipe 14, is a return section 20. Such return sections are connected to the containers at a point slightly above what is termed the ice line. The return sections and at least a portion of the return pipe are contained within tank 10 above the brine line. A pump 18, is present for conveying return water to tank 15. In operation, the containers are set within the cold brine within tank 10. The return sections are then coupled to the containers and the valves on distributers 19, opened. Water through force of gravity then passes through pipe 13, to the containers. When water in the containers reaches the height of the "water-line" (see container A), the pump 18, causes the water as it rises to a point above the "ice line" (see container B) to be drawn back to the tank 15. There is then present in the containers an agitation of the water. The water is maintained at a level higher than the level of the brine line. As the formation of ice gradually takes place in the containers, there is thus present above the "ice line" a layer of water, which acts as a seal to prevent atmospheric air reaching the ice. Thus, a continuous cycle of raw water is maintained during the entire freezing period and may be termed a semi-inclosed system of water delivery, although a closed system may be employed. When ice has been properly formed in the containers or molds, (see container C) the valved distributers are shut off, the return sections 20, disconnected from the containers and the latter removed from the tank 10. From the above description, it will be observed that the containers are filled with water directly from the supply pipe. This is advantageous and reduces cost of filling over present methods. By having a greater portion of the delivery and return pipes in the tank 10, water therein is maintained cool, thus facilitating the working of the apparatus. Among the many advantages claimed for the above method of ice manufacture, mention may be made of the following:

The method employed resembles to a degree the natural process of ice formation, in that raw water may be employed successfully, commercially speaking. The cost of ice production is materially reduced and plants now using distilled water may have the apparatus employed in my method readily added to present equipment at slight cost and the use of distilled water discontinued.

What I claim is:

1. The herein described method of manufacturing ice artificially which consists in introducing to molds positioned with respect to a freezing agent, raw water of predetermined constant static head in a continuous cycle to promote an agitation thereof in said molds during the freezing process, the water being maintained at a level higher than the level of the freezing agent line.

2. In apparatus for the artificial manufacture of ice, a source of water supply maintained at a constant level at a given pressure, a tank containing a freezing agent, molds positioned therein, means for feeding water under force of gravity to said molds, and means for returning at least a portion of said water to the source of supply, said supply and return comprising a continuous cycle of water for creating an agitation within said molds during the freezing process, the water being maintained at a level higher than the level of the freezing agent line.

3. Apparatus of the character stated embracing a tank containing brine, a mold located therein, means for introducing to said mold raw water of predetermined static head in a continuous cycle, the water being maintained at a level higher than the brine line and means for maintaining constant said static head.

4. Apparatus of the character stated embracing a tank containing brine, a mold contained therein, a source of raw water supply of predetermined static head located above said receptacle, piped connections for establishing communication through gravity between said source of supply and said mold, the water being maintained at a level higher than the brine line, means for returning overflow water from said mold to said source of supply and means for maintaining constant said static head.

5. Apparatus of the character stated embracing a covered tank containing brine, a series of molds located therein, a source of raw water supply of predetermined static head, means for maintaining said static head constant, and piped connections for establishing a continuous cycle of water between the molds and said source of supply, the major portion of said piped connections being contained within said tank above the brine line thereof.

In testimony whereof, I have hereunto signed my name.

GEORGE T. TURNER.

Witnesses:
WILLIAM J. JACKSON,
HELEN M. BYRNE.

Copies of this patent may be obtained for five cents each, by addressing the "Commissioner of Patents, Washington, D. C."